United States Patent Office
3,635,907
Patented Jan. 18, 1972

3,635,907
PROCESS FOR THE PRODUCTION OF
POLYURETHANES
Helmut Schulze, Erlenbach, and Martin Pfistermeister,
Oberbruch, Germany, assignors to Glanzstoff AG,
Wuppertal, Germany
No Drawing. Filed July 9, 1969, Ser. No. 840,516
Claims priority, application Germany, July 13, 1968,
P 17 70 884.8
Int. Cl. C08g 22/04, 22/06
U.S. Cl. 260—77.5 AM     9 Claims

ABSTRACT OF THE DISCLOSURE

Process for producing polyurethanes in which a macrodiol is reacted with a diisocyanate containing at least one aromatic radical to form a pre-adduct; the pre-adduct is reacted with chain extenders; diphenylmethane-4,4'-diisocyanates and a diol are added to the reaction mixture; and the reaction is stopped after the polyurethane has reached a given viscosity by the addition of a monoalcohol. The process produces polyurethanes having outstanding properties.

---

It is known that polyurethanes can be obtained by reacting diols with diisocyanates. Thus, in Agnew. Chem. 59 (9), 257–88 (1947), O. Bayer describes the reaction of diisocyanates with low molecular weight diols, such as 1,4-butylene glycol, to form polyurethanes. Bayer also refers to the use of macrodiols such as linear polyesters with terminal hydroxyl groups in the production of polyurethanes (cf. page 262, column 1, last paragraph). Although numerous polyurethanes that can be used for a variety of purposes may be obtained by this process, it is extremely difficult to obtain reproducible products with constant properties in this way. Particularly serious difficulties are encountered in the production of polyurethanes with specific molecular weights and also in stabilizing these polyurethanes against further polymerization.

It is also known that diols can initially be reacted with polyisocyanates to form a pre-adduct containing terminal NCO-groups and that chain extenders can be added to the pre-adduct thus obtained. Compounds containing at least two hydrogen atoms which react with the NCO-groups in the molecule may be used as the chain extenders. Compounds of this kind include inter alia diamines such as ethylene diamine, propylene diamine, piperazine, and tolylene diamine; dihydric alcohols and phenols such as ethylene glycol, butane diol, and hydroquinone; and aminoalcohols such as ethanolamine. Such substances as hydrazine, carbodihydrazide and dicarboxylic acid dihydrazides are also suitable.

One molecule of the chain extender reacts with one of the terminal NCO-groups of two different molecules of the preadduct. In this way, several molecules can be linked together to form a chain.

In cases where trifunctional compounds such as diethanolamine, glycerine and so are used, crosslinking can occur in some instances.

It has proved to be of advantage in cases where chain extenders are used additionally to employ chain regulators or stabilizers. These chain regulators react as monofunctional compounds. They block reactive terminal groups of the chain and to some extent prevent the chain from growing beyond a certain degree of polymerization. Suitable stabilizers include inter alia amines such as aniline diethylamine. Aminoalcohols in whose case the amino group reacts more quickly than the OH-group, have also been used. The reaction between the chain extenders and the NCO-groups can also be stopped by the addition of alcohols such as ethanol.

A process for the production of linear polyurethanes of adjustable constant viscosity is also known. In this process, macrodiols, optionally in admixture with low molecular weight aliphatic diols, are reacted with diisocyanates containing at least one aromatic radical, to form a pre-adduct containing terminal NCO-groups which is subsequently reacted with a mixture of chain extenders consisting of from 0.15 to 0.85 mol of one or more diamines and/or hydrazine and/or a hydrazine derivative and from 0.1 to 0.8 mols of aliphatic monoaminodihydroxy compound per mol of pre-adduct. The total number of mols of the chain extenders is smaller than the total number of mols of the pre-adduct. When the required viscosity has been reached, the reaction is terminated by the addition of a monoalcohol.

Although the polyurethanes obtained by this process are valuable products which can be further processed for example into filaments or coagulate films with good properties, they are not suitable for the production of gels of the kind required for further processing into covering layers of synthetic leather. The preparation of gels of this kind is described for example in French patent specification No. 1,499,672. If in facta gel is prepared from polyurethanes of this kind, spread in known manner over a substrate of the kind used in the production of artificial leather, and then coagulated and washed with water, the layer collapses when dried into a non-porous film which is impermeable to water vapor.

It has now been found that polyurethanes with outstanding properties can be obtained by a reaction, optionally carried out in solution, involving macrodiols and diisocyanates containing at least one aromatic radical, and a mixture of chain extenders consisting of from 0.15 to 0.85 mol of one or more diamines and or hydrazine and or hydrazine derivatives per mol of pre-adduct containing terminal NCO-groups and an aliphatic aminohydroxy compound, the total number of mols of the extenders being smaller than the total number of mols of the pre-adduct, and stopping the reaction by the addition of a monoalcohol after the required viscosity has been reached, providing diphenylmethane-4,4'-diisocyanate and from 0.75 to 0.95 times the molar quantity of one or more molecular weight aliphatic or araliphatic diols, based on the diphenylmethane-4,4'-diisocyanate are added following the introduction of the chain extenders.

The mixture of chain extenders preferably consists of from 0.15 to 0.85 mol of one or more diamines and/or hydrazine and/or hydrazine derivatives and from 0.05 to 0.75 mol of an aliphatic monoaminomonohydroxy or monoaminodihydroxy compound.

In the context of this invention, macrodiols with a molecular weight of from 700 to 5000, especially from 1000 to 2000, are suitable for preparing the pre-adduct containing NCO-groups. The diphenylmethane-4,4'-diisocyanate additionally added may be used in admixture with up to 10 mol percent of toluene diisocyanate. Diethanolamine is preferably used as the monoaminodihydroxy compound. It is preferred to add from 1.0 to 2.0 mols of diphenylmethane-4,4'-diisocyanate and from 0.9 to 1.8 mols of 1,4-butane diol per mol of pre-adduct containing terminal NCO-groups.

In the context of this invention, compounds containing terminal hydroxyl groups such as polyesters, copolyesters, polyethers, copolyethers, polyacetals, polyetheresters, polylactones and polyesteramides, may be used as the macrodiols. Modified macrodiols obtained for example from 1 mol of diisocyanate and 2 mols of macrodiol, may also be used. The macrodiol may be used either individually or in admixture with other macrodiols.

Diisocyanates containing at least one aromatic radical may be used to prepare the pre-adduct containing terminal NCO-groups. Compounds of this kind include phenylene diisocyanate or naphthalene diisocyanate. Diphenylmethane-4,4'-diisocyanate has proved to be particularly suitable. For the further reaction, the pre-adduct containing terminal NCO-groups is preferably dissolved in a solvent such as for example dimethyl formamide, dimethyl sulphoxide or dimethyl acetamide.

Any of the known chain-extending diamines can be used in the process but ethylene diamine, 1,3-diaminopropane, and m-xylylene diamine have proved to be of particular value. Diamines of the kind used as chain extenders in accordance with the invention also include compounds which contain more nitrogen in the molecule, for example tertiary nitrogen, such as bis-(aminopropyl)-methylamine. The diamines may be used either individually or in admixture with one another.

Hydrazine and hydrazine derivatives such as carbodihydrazide and dicarboxylic acid dihydrazides may also be used to good effect in accordance with the invention.

Suitable additional chain-extending compounds include aliphatic monoaminomonohydroxy compounds such as for example ethanolamine and, preferably, monoaminodihydroxy compounds, among which diethanolamine is particularly suitable. This component is added in a quantity of from 0.05 to 0.75 mol per mol of pre-adduct.

After the mixture of chain extenders has been added, diphenylmethane-4,4'-diisocyanate and from 0.75 to 0.95 times the molar quantity of one or more aliphatic or araliphatic diols, based on the diisocyanate additionally added, are added. The preferred order is to add the diisocyanate first and then the diol to the reaction mixture so that there is always an excess of NCO-groups. The quantity in which the diisocyanate additionally added is used and hence also the corresponding quantity of diol, may vary within relatively wide limits. Additions of from about 0.5 to 20 mols of diisocyanate per mol of pre-adduct, based on the pre-adduct containing terminal NCO-groups, have proved to be suitable. The diphenylmethane-4,4'-diisocyanate may be added to the reaction mixture either in solid form or in solution. Examples of suitable solvents include dimethyl formamide, dimethyl sulphoxide, dimethyl acetamide or hexamethyl phosphoric acid triamide.

The following are mentioned as examples of low molecular weight aliphatic or araliphatic diols which may be used for the purposes of the invention: ethylene glycol, 1,4-butane diol, triethylene glycol, 1,4-bis-hydroxymethyl)-benzene and 1,4-bis-hydroxyethoxy)-benzene. The diols can be added either individually or in admixture and are preferably used in solution, in which dimethyl formamide, dimethyl sulphoxide, dimethyl acetamide or hexamethyl phosphoric acid triamide, for example, may again be used as the solvents.

A particularly advantageous combination of diisocyanate and diol consists of from 1.0 to 2.0 mols of diphenylmethane-4,4'-diisocyanate and from 0.9 to 1.8 mols of 1,4-butane diol per mol of pre-adduct containing terminal NCO-groups.

After the required viscosity, which may vary between about 50 and about 2500 poises, depending upon the purpose for which the end product is to be used, has been reached, the reaction is stopped by the addition of a monoalcohol such as methanol or ethanol. Higher viscosities may of course also be selected.

The polyurethanes produced in accordance with the invention are substantially stable and can be stored for several days without any appreciable change in their viscosity. It is also possible by the process according to the invention reproducibly to provide a specific viscosity so that the end products can be guaranteed to be uniform in quality which is of particular importance in batch operation.

The polyurethanes can be further processed for example into films or filaments. It is in the very production of filaments that it is of considerable advantage that the spinning composition does not undergo any property changes from the beginning to the end of the spinning process, because otherwise irregularities would occur, for example in its affinity for dyes.

Mouldings obtained from the polyurethanes prepared in accordance with the invention are further distinguished by their improved ultimate tensile strength.

Strength can be varied and adjusted within a wide range by varying the quantity in which the diphenylmethane-4,4'-diisocyanate is added. Thus, ultimate tensile strength is increased continuously from 3.2 to 4 kp./mm.$^2$ by increasing the quantity of diisocyanate added from 0.25 to 3 mols, as described in detail in Example 14. Resistance to high temperatures is also very good. The softening poinits of the polyurethanes produced in accordance with the invention are above 200° C.

The polyurethanes obtained by the process according to the invention are particularly suitable for the production of gels of the kind required for covering layers or top layers of artificial leather. In cases where cover layers of this kind are produced for example in accordance with Dutch patent application 6617472, artificial leather of particularly high quality in regard to its resistance to low temperatures is obtained.

Cover layers in which the polyurethanes prepared in accordance with the invention have been used, also show outstanding recovery power. Polyurethanes that have been prepared from 1.0 to 2.0 mols of diphenylmethane-4,4'-diisocyanate and 0.9 to 1.80 mols of 1,4-butane diol per mol of pre-adduct containing terminal NCO-groups, yield cover layers with particularly short recovery times. This is of particular importance so far as artificial leather is concerned because no impressions should be left following the application of an external pressure and the material should quickly recover its original form.

No difficulties are involved in processing the gels into cover layers. The layer of gel applied to the substrate does not disintegrate when dried. The finished cover layer is distinguished by its high permeability to water vapor.

The invention is illustrated by the following examples:

EXAMPLE 1

2 mols (4000 g.) of polyethylene adpate (MW 2000) and 3 mols (750 g.) of diphenylmethane-4,4'-diisocyanate are heated for 1.5 hours to 90° C. The macrodiisocyanate formed is cooled to approximately 70° C. and dissolved in 7.5 liters of dimethyl formamide. A solution of 0.08 mol (8.4 g.) of diethanolamine and 0.77 mol (46.2 g.) of ethylene diamine in 3.2 liters of dimethyl formamide is added to the resulting solution with vigorous stirring at a temperature of 30° C. A solution of 6.4 mols (1.6 kg.) of diphenylmethane-4,4'-diisocyanate in 2.7 liters of dimethyl formamide is then added, followed by the introduction of a solution of 4.7 mols (520 g.) of 1,4-butane diol in 1.3 liters of dimethyl formamide. The mixture is stirred and after it has reached a viscosity of 800 poises 500 ml. of ethanol in 500 ml. of dimethyl formamide are added to it.

A stable smooth cover layer prepared from the polyurethane can be applied to an impregnated web and does not break up. The artificial leather thus produced is highly flexible. A measurement carried out with a Bally Flexometer in accordance with IUP specification No. 20 gave over 200,000 flexures.

EXAMPLE 2

2 mols of polybutylene adipate (2160 g., MW 1080) and 3 mols of diphenylmethane-4,4'-diisocyanate (750 g.) are heated for 1.5 hours to 90° C., the macrodiisocyanate formed is cooled to around 70° C. and dissolved in 5 liters of anhydrous dimethyl formamide. A mixture of 0.08 mol (8.4 g.) of diethanolamine and 0.77 mol (46.2 g.) of ethylene diamine in 1.44 liters of dimethyl formamide is added to the resulting solution slowly with vigorous stirring at a temperature of 30° C. After thorough mixing, a solution of 2.24 mols of diphenylmethane-4,4'-diisocyanate (560 g.) in 1.08 liters of dimethyl formamide is then added, followed by 2.02 mols of 1,6-hexane diol (238 g.) in 1.08 liters, and the mixture is transferred to an apparatus which indicates viscosity. At 40–60° C., a slow reaction takes place with gentle stirring. This reaction can be stopped when the required viscosity has been reached by the addition of a mixture of 360 ml. of alcohol and 360 ml. of dimethyl formamide.

EXAMPLE 3

2 mols (2360 g.) of polydiethylene glycol adipate (MW 1180) and 3 mols (750 g.) of diphenylmethane-4,4'-diisocyanate are heated for 1.5 hours to 90° C., the macrodiisocyanate formed is cooled to around 70° C. and then dissolved in 5 liters of anhydrous dimethyl formamide. A mixture of 0.08 mol (8.4 g.) of diethanolamine and 0.77 mol (46.2 g.) of ethylene diamine in 1.44 liters of dry dimethyl formamide is then slowly added to the resulting solution with vigorous stirring at a temperature of 30° C. After thorough mixing, 2.57 mols of diphenylmethane-4,4'-diisocyanate (642 g.) in flake form and, after complete dissolution, 2.32 mols (209 g.) of 1,4-butane diol in 515 ml. of dry dimethyl formamide are added and the mixture is transferred to an apparatus which indicates viscosity. At 40–60° C., a slow reaction takes place with gentle stirring. After the required viscosity has been reached, this reaction may be terminated by the addition of a mixture of 360 ml. of alcohol and 360 ml. of dimethyl formamide.

EXAMPLE 4

2.0 mols of polycaprolactone (1670 g.), molecular weight 835, and 3 mols of diphenylmethane-4,4'-diisocyanate (750 g.) are heated for 1.5 hours to 90° C., the macrodiisocyanate formed is cooled to approximately 70° C. and then dissolved in 4.6 liters of anhydrous dimethyl formamide. A mixture of 0.08 mol (8.4 g.) of diethanolamine and 0.77 mol (46.2 g.) of ethylene diamine in 1.11 liters of dry dimethyl formamide, is then slowly added to the resulting solution with vigorous stirring at a temperature of 30° C. After thorough mixing, 0.808 mol (202 g.) of solid diphenylmethane-4,4'-diisocyanate and after complete dissolution 0.726 mol (85 g.) of 1,6-hexane diol in 550 ml. of dry dimethyl formamide are added and the mixture transferred to an apparatus which indicates viscosity. At 40–60° C., a slow reaction takes place with gentle stirring. After the required viscosity has been reached, this reaction can be terminated by the addition of a mixture of 277 ml. of alcohol and 277 ml. of dimethyl formamide.

EXAMPLE 5

2 mols (5400 g.) of polydiethylene glycol adipate, molecular weight 2700, and 3 mols (750 g.) of diphenylmethane-4,4'-diisocyanate are heated for 1.5 hours to 90° C., the macrodiisocyanate formed is cooled to approximately 70° C. and then dissolved in 12 liters of anhydrous dimethyl formamide. A mixture of 0.08 mol (8.4 g.) of diethanolamine and 0.77 mol (46.2 g.) of ethylene diamine in 3.6 liters of dry dimethyl formamide is then slowly added to the resulting solution with vigorous stirring at a temperature of 30° C. After thorough mixing, a solution of 10.6 mols (2650 g.) of diphenylmethane-4,4'-diisocyanate in 3.15 liters of anhydrous dimethyl formamide and then a solution of 9.5 mols (855 g.) of 1,4-butane diol in 3.6 liters of anhydrous dimethyl formamide are added and the mixture is transferred to an apparatus indicating viscosity. At 40 to 60° C., a slow reaction takes place with gentle stirring. After the required viscosity has been reached, this reaction may be terminated by the addition of a mixture of 900 ml. of alcohol and 900 ml. of dimethyl formamide.

EXAMPLE 6

2 mols (4600 g.) of polybutylene adipate 1150, molecular weight 2300, and 3 mols (750 g.) of diphenylmethane-4,4'-diisocyanate are heated for 1.5 hours to 90° C., the macrodiisocyanate formed is cooled to approximately 70° C. and then dissolved in 9.5 liters of anhydrous dimethyl formamide. A mixture of 0.08 mol (8.4 g.) of diethanolamine and 0.77 g. (46.2 g.) of ethylene diamine in 3.1 liters of anhydrous dimethyl formamide is then slowly added to the resulting solution with vigorous stirring at a temperature of 30° C. After thorough stirring, a solution of 8.45 mols (2113 g.) of diphenylmethane-4,4'-diisocyanate in 3.1 liters of anhydrous dimethyl formamide and then a solution of 7.7 mols (694 g.) of 1,4-butane diol in 3.1 liters of anhydrous dimethyl formamide are added and the mixture is transferred to an apparatus which indicates viscosity. At 40 to 60° C., a slow reaction takes place with gentle stirring. After the required viscosity has been reached, this reaction can be terminated by the addition of a mixture of 770 ml. of alcohol and 770 ml. of dimethyl formamide.

EXAMPLE 7

2 mols (7600 g.) of polybutylene adipate, molecular weight 3800, and 3 mols of diphenylmethane-4,4'-diisocyanate (750 g.) are heated for 1.5 hours to 90° C., the macrodiisocyanate formed is cooled to approximately 70° C. and then dissolved in 16.7 liters of dry dimethyl formamide. A mixture of 0.08 mol (8.4 g.) of diethanolamine and 0.77 mol (46.2 g.) of ethylene diamine in 5.1 liters of anhydrous dimethyl formamide is then slowly added to the resulting solution with vigorous stirring at a temperature of 30° C. After thorough mixing, a solution of 16.6 mols (4150 g.) of diphenylmethane-4,4'-diisocyanate in 5.1 liters of anhydrous dimethyl formamide and then a solution of 14.9 mols (1340 g.) of 1,4-butane diol in 5.1 liters of anhydrous dimethyl formamide are added and the mixture is transferred to an apparatus which indicates viscosity. At 40 to 60° C., a slow reaction takes place with gentle stirring. After the required viscosity has been reached, this reaction can be terminated by the addition of a mixture of 1.26 liters of dimethyl formamide.

EXAMPLE 8

2 mols (2360 g.) of polydiethylene glycol adipate, molecular weight 1180, and 3 mols (750 g.) of diphenylmethane-4,4'-diisocyanate are heated for 1.5 hours to 90° C., the macrodiisocyanate formed is cooled to approximately 70° C. and then dissolved in 6 liters of anhydrous dimethyl formamide. A mixture of 0.08 mol (8.4 g.) of diethanolamine and 0.77 mol (46.2 g.) of ethylene diamine in 2 liters of anhydrous dimethyl formamide is then slowly added to the resulting solution with vigorous stirring at a temperature of 30° C. After thorough mixing, 2.47 mols (617 g.) of solid diphenylmethane-4,4'-diisocyanate and then a solution of 2.22 mols (138 g.) of ethylene glycol in 1.55 liters of anhydrous dimethyl formamide are added and the mixture is transferred to an apparatus which indicates viscosity. At 40 to 60° C., a slow reaction takes place with gentle stirring. After the required viscosity has been reached, this reaction can be terminated by the addition of a mixture of 380 ml. of alcohol and 380 ml. of dimethyl formamide.

EXAMPLE 9

2 mols of polydiethylene glycol adipate (2360 g.), molecular weight 1180, and 3 mols (750 g.) of diphenylmethane-4,4'-diisocyanate are heated for 1.5 hours to 90° C., the macrodiisocyanate formed is cooled to approximately 70° C. and then dissolved in 6 liters of anhydrous dimethylformamide. A mixture of 0.08 mol (8.4 g.) of diethanolamine and 0.77 mol (4.62 g.) of ethylene diamine in 2 liters of anhydrous dimethyl formamide is then slowly added to the resulting solution with vigorous stirring at a temperature of 30° C. After thorough mixing, 2.75 mols (688 g.) of solid diphenylmethane-4,4'-diisocyanate and then a solution of 2.47 mols (291 g.) of 1,6-hexane diol in 2 liters of anhydrous dimethyl formamide are then added and the mixture is transferred to an apparatus which indicates viscosity. At 40 to 60° C., a slow reaction takes place with gentle stirring. After the required viscosity has been reached, this reaction can be treminated by the addition of a mixture of 380 g. of alcohol and 380 g. of dimethyl formamide.

EXAMPLE 10

2 mols (1900 g.) of polyethylene glycol adipate, molecular weight 950, and 3 mols (750 g.) of diphenylmethane-4,4'-diisocyanate are heated for 1.5 hours to 90° C., the macrodiisocyanate formed is cooled to approximately 70° C. and then dissolved in 4.3 liters of anhydrous dimethyl formamide. A mixture of 0.08 mol (8.4 g.) of diethanolamine and 0.77 mol (46.2 g.) of ethylene diamine in 2 liters of anhydrous dimethyl formamide is then slowly added to the resulting solution with vigorous stirring at a temperature of 30° C. After thorough mixing, 1.58 mols (395 g.) of solid diphenylmethane-4,4'-diisocyanate and then a solution of 1.43 mols (209 g.) of 1,8-octane diol in 1.23 liters of dry dimethyl formamide are added and the mixture is transferred to an apparatus which indicates viscosity. At 40 to 60° C., a slow reaction takes place with gentle stirring. After the required viscosity has been reached, this reaction can be terminated by the addition of a mixture of 320 ml. of alcohol and 320 ml. of dimethyl formamide.

EXAMPLE 11

2 mols (1900 g.) of polydiethylene glycol adipate, molecular weight 950, and 3 mols of diphenylmethane-4,4'-diisocyanate (750 g.) are heated for 1.5 hours to 90° C., the macrodiisocyanate formed is then cooled to approximately 70° C., and dissolved in 4.3 liters of anhydrous dimethyl formamide. A mixture of 0.08 mol (8.4 g.) of diethanolamine and 0.77 mol (46.2 g.) of ethylene diamine in 2 liters of anhydrous dimethyl formamide is then slowly added to the resulting solution with vigorous stirring at a temperature of 30° C. After thorough mixing, 1.59 mols (396 g.) of solid diphenylmethane-4,4'-diisocyanate and then a solution of 1.44 mols of triethylene glycol in 1.25 liters of dry methyl formamide are added, and the mixture is transferred to an apparatus which indicates viscosity. At 40 to 60° C., there is a slow reaction with gentle stirring. After the required viscosity has been reached, this reaction can be terminated by the addition of a mixture of 320 ml. of alcohol and 320 ml. of dimethyl formamide.

EXAMPLE 12

2 mols (4000 g.) of polydiethylene glycol adipate, molecular weight 2000, and 3 mols (750 g.) of diphenylmethane-4,4'-diisocyanate are heated for 1.5 hours to 90° C., the macrodiisocyanate formed is cooled to approximately 70° C. and then dissolved in 7.5 liters of anhydrous dimethyl formamide. A mixture of 0.7 mol (73.5 g.) of diethanolamine and 0.15 mol (9.0 g.) of ethylene diamine is in 2.2 liters of dry dimethyl formamide is then slowly added to the resulting solution with vigorous stirring at a temperature of 30° C. After thorough mixing, 2.5 mols (625 g.) of diphenylmethane-4,4'-diisocyanate in flake form and after complete dissolution 2.25 mols (202 g.) of 1,4-butane diol in 500 ml. of dry dimethyl formamide are added and the mixture is transferred to an apparatus which indicates viscosity. At 40 to 60° C., a slow reaction takes place with gentle stirring. After the required viscosity has been reached, this reaction can be terminated by the addition of a mixture of 360 ml. of alcohol and 360 ml. of dimethyl formamide.

EXAMPLE 13

2 mols of polydiethylene glycol adipate (4000 g.), molecular weight 2000, and 3 mols (750 g.) of diphenylmethane-4,4'-diisocyanate are heated for 1.5 hours to 90° C., the macrodiisocyanate formed is cooled to approximately 70° C. and then dissolved in 7.5 liters of anhydrous dimethyl formamide. A mixture of 0.05 mol (5.25 g.) of diethanolamine and 0.8 mol (48 g.) of ethylene diamine in 1.4 liters of dry dimethyl formamide is then slowly added to the resulting solution with vigorous stirring at a temperature of 30° C. After thorough mixing, 2.5 mols (625 g.) of diphenylmethane-4,4'-diisocyanate in flake form and after complete dissolution 2.25 g. mol (202 g.) of 1,4-butane diol in 500 ml. of dry dimethyl formamide are added and the mixture is transferred to an apparatus which indicates viscosity. At 40 to 60° C., a slow reaction takes place which can be terminated after the required viscosity has been reached by the addition of a mixture of 360 ml. of alcohol and 360 ml. of dimethyl formamide.

EXAMPLE 14

2 mols (2360 g.) of polydiethylene glycol adipate, molecular weight 1180, and 3 mols (750 g.) of diphenylmethane-4,4'-diisocyanate are heated for 1.5 hours to 90° C., the macrodiisocyanate formed is cooled to approximately 70° C. and then dissolved in 5 liters of anhydrous dimethyl formamide. A mixture of 0.08 mol (8.4 g.) of diethanolamine and 0.77 mol (4.62 g.) of ethylene diamine in 144 liters of dry dimethyl formamide is then added slowly to the resulting solution with vigorous stirring at a temperature of 30° C. After thorough mixing, 0.25 to 3.0 mols (62.5 g.–750 g.) of diphenylmethane-4,4'-diisocyanate in flake form and after complete dissolution 0.225 to 2.85 mols (22.5 to 256.5 g.) in 55 to 630 ml. of dimethyl formamide are added and the mixture is transferred to an apparatus which indicates viscosity. At 40 to 60° C., there is a slow reaction which can be terminated after the required viscosity has been reached by the addition of a mixture of 360 ml. of alcohol and 360 ml. of dimethyl formamide.

EXAMPLE 15

2 mols of polydiethylene glycol adipate (3000 g.), molecular weight 1500, and 3 mols (750 g.) of diphenylmethane-4,4'-diisocyanate are heated for 1.5 hours to 90° C., the macrodiisocyanate formed is cooled to approximately 70° C. and then dissolved in 6.5 liters of anhydrous dimethyl formamide. A mixture of 0.1 mol (6.1 g.) of ethanolamine and 0.75 mol (45.0 g.) of ethylene diamine in 1.5 liters of dry dimethyl formamide is then slowly added to the resulting solution with vigorous stirring at a temperature of 30° C. After thorough mixing, 2.5 mols (625 g.) of diphenylmethane-4,4'-diisocyanate in flake form and after complete dissolution 2.25 mols (202.5 g.) of 1,4-butane diol in 500 ml. of dimethyl formamide are added and the mixture is transferred to an apparatus which indicates viscosity. At 40 to 60° C., there is a slow reaction which can be terminated after the required viscosity has been reached by the addition of a mixture of 350 ml. of alcohol and 350 ml. of dimethyl formamide.

The invention is hereby claimed as follows:

1. In a process for the production of polyurethanes in which macrodiols having a molecular weight of from 700 to 5,000 are reacted with diisocyanates containing at least one aromatic radical to form a pre-adduct containing terminal NCO-groups and said pre-adduct is reacted with a mixture of chain extenders consisting of 0.15 to 0.85 mol of at least one member of the group consisting of diamines, hydrazine and hydrazine derivatives per mol of pre-adduct containing terminal NCO-groups, and in aliphatic aminohydroxy compound, the total number of mols of the chain extenders being smaller than the total number of mols of the pre-adduct, and the reaction is stopped by the addition of a monoalcohol, the improvement which comprises: adding to the reaction mixture subsequent to the addition of the mixture of chain extenders both about 0.5 to 20 mols of diphenylmethane- 4,4'-diisocyanate per mol of pre-adduct and 0.75 to 0.95 times the molar quantity based on the diisocyanate additionally added of one or more low molecular weight aliphatic or araliphatic diols.

2. A process as in claim 1, wherein the mixture of chain extenders consists of from 0.15 to 0.85 mols of at least one member of the group consisting of diamines, hydrazine and hydrazine derivatives and from 0.05 to 0.75 mol of an aliphatic monoaminodihydroxy compound.

3. A process as claimed in claim 2, wherein diethanolamine is used as the aliphatic monoaminodihydroxy compound.

4. A process as in claim 1, wherein macrodiols with a molecular weight of from 1000 to 2000 are used to prepare the pre-adduct containing terminal NCO-groups.

5. A process as in claim 1, wherein from 0.5 to 20 mols of diphenylmethane-4,4'-diisocyanate are added per mol of pre-adduct.

6. A process as in claim 1, wherein diphenylmethane-4,4'-diisocyanate is additionally used in admixture with up to 10 mol percent of toluene diisocyanate.

7. A process as in claim 1, wherein from 1.0 to 2.0 mols of diphenylmethane-4,4'-diisocyanate and from 0.9 to 1.8 mols of 1,4-butane diol are added per mol of preadduct containing terminal NCO-groups.

8. A process as in claim 1 wherein said aliphatic or araliphatic diols are selected from the group consisting of ethylene glycol, 1,4-butane diol, triethylene glycol, 1,4-bis-(hydroxymethyl)-benzene and 1,4-bis-(hydroxyethoxy)-benzene.

9. The polyurethane produced by the process of claim 1.

References Cited

UNITED STATES PATENTS

| | | | |
|---|---|---|---|
| 3,165,566 | 1/1965 | Murphy et al. | 260—77.5 |
| 3,461,101 | 8/1969 | Oretel et al. | 260—77.5 |
| 3,494,894 | 2/1970 | Urgesi | 260—77.5 |

DONALD E. CZAJA, Primary Examiner

R. W. GRIFFIN, Assistant Examiner

U.S. Cl. X.R.

117—161 KP; 260—32.6 N, 77.5 AA, 77.5 AQ, 77.5 SP

UNITED STATES PATENT OFFICE
CERTIFICATE OF CORRECTION

Patent No. 3,635,907   Dated January 18, 1972

Inventor(s) Helmut Schulze and Martin Pfistermeister

It is certified that error appears in the above-identified patent and that said Letters Patent are hereby corrected as shown below:

Column 1, line 19, "isocyanates" should read -- isocyanate --; line 27, "Agnew." should read -- Angew. --; line 59, "and so are" should read -- and so on are --; line 67, "aniline" should read -- aniline and --

Column 2, line 23, "facta" should read -- fact a --; line 44, "the diphenylmethane-4,4'-diisocyanate are added" should read -- the diisocyanate additionally added --.

Column 4, line 13, "poinits" should read -- points --; line 41, "adpate" should read -- adipate --.

Column 9, line 10, claim 3, "as claimed in" should read -- as in --.

Signed and sealed this 29th day of May 1973.

(SEAL)
Attest:

EDWARD M. FLETCHER, JR.
Attesting Officer

ROBERT GOTTSCHALK
Commissioner of Patents